US007355627B2

(12) United States Patent
Yamazaki et al.

(10) Patent No.: US 7,355,627 B2
(45) Date of Patent: Apr. 8, 2008

(54) MOVING OBJECT MONITORING SURVEILLANCE APPARATUS FOR DETECTING, TRACKING AND IDENTIFYING A MOVING OBJECT BY ZOOMING IN ON A DETECTED FLESH COLOR

(75) Inventors: Sadahiko Yamazaki, Osaka (JP); Kouich Tanibuchi, Osaka (JP)

(73) Assignee: Japan Microsystems Co., Ltd. (JP)

( * ) Notice: Subject to any disclaimer, the term of this patent is extended or adjusted under 35 U.S.C. 154(b) by 646 days.

(21) Appl. No.: 10/350,832

(22) Filed: Jan. 24, 2003

(65) Prior Publication Data

US 2003/0142209 A1    Jul. 31, 2003

(30) Foreign Application Priority Data

Jan. 25, 2002   (JP)   ............................. 2002-016749

(51) Int. Cl.
*H04N 7/18*    (2006.01)
(52) U.S. Cl. ...................... 348/143; 348/152; 348/155
(58) Field of Classification Search ................ 348/143, 348/152, 155
See application file for complete search history.

(56) References Cited

U.S. PATENT DOCUMENTS

| 5,969,755 A | * | 10/1999 | Courtney | .................... 348/143 |
| 6,661,450 B2 | * | 12/2003 | Yata | ........................... 348/169 |
| 6,741,977 B1 | * | 5/2004 | Nagaya et al. | ................. 707/1 |

* cited by examiner

*Primary Examiner*—Tuan Ho
*Assistant Examiner*—Anthony J Daniels
(74) *Attorney, Agent, or Firm*—Thompson Hine LLP

(57) ABSTRACT

A moving object monitoring surveillance apparatus that controls a camera using a motorized panhead and a motorized zoom lens to identify correctly a moving object, particularly, a person is disclosed. The apparatus includes a video device acquiring information of the image of a moving object as a video signal, a panhead for panning and tilting the video device, a frame grabber for extracting, frame by frame, a still image from the video signal output from the video device and binarizing the still image into frame data, a plurality of frame memories for alternately storing the binarized frame data, a CPU for controlling the operation of the panhead and for processing the frame data, and an image database for storing the processed data. The video device sequentially monitors at least one single surveillance area. The CPU compares frame data with immediately prior frame data to determine a difference therebetween, tracks coordinates corresponding to the difference if the difference is detected, and detects and expands a particular color.

12 Claims, 11 Drawing Sheets

MOVING OBJECT MONITORING SURVEILLANCE APPARATUS FOR DETECTING, TRACKING AND IDENTIFYING A MOVING OBJECT BY ZOOMING IN ON A DETECTED FLESH COLOR

FIELD OF THE INVENTION

The present invention relates to a surveillance apparatus for monitoring a moving object employing an optical lens or lenses and a solid-state camera using Charge Coupled Device (hereinafter said CCD camera) and, more particularly, to an apparatus which extracts the face of a person who enters a surveillance area and captures the image of the face of the person.

PRIOR ART

Means for monitoring a moving object using a CCD camera and recording the image of the object in a magnetic tape is known. During this use, the CCD camera focuses on a moving object with lenses in front of the CCD camera. If a surveillance area is widened using a wide-angle lens, the percentage of the area of the moving object to the entire frame becomes relatively small. If the CCD camera is used to monitor a person, the face of the person becomes too small and sharpness of the face image is destroyed. It is difficult to identify the person. Conversely, if a telephoto lens is used to capture an enlarged image of the person, the surveillance area becomes too small, and a plurality of surveillance cameras are required. The present invention overcomes the above-mentioned drawback, and it is an object of the present invention to provide a moving object monitoring surveillance apparatus which controls a camera using a motorized panhead and a motorized zoom lens to identify correctly a moving object, particularly, a person.

SUMMARY OF THE INVENTION

In order to achieve the above object, a moving object monitoring surveillance apparatus of the present invention includes a video device acquiring information of the image of a moving object as a video signal, a panhead for panning and tilting the video camera device, a frame grabber for extracting, frame by frame, a still image from the video signal output from the video camera device and binarizing the still image into frame data, a plurality of frame memories for alternately storing the binarized frame data, a CPU for controlling the operation of the panhead and for processing the frame data, and an image database for storing the processed data. The video camera device captures the moving image, thereby obtaining the video signal, and is directed to any direction using the panhead. The frame grabber extracts, frame by frame, the still image from the video signal sequentially output from the video camera device. This is a first process of the CPU which determines whether a moving object is present in frames with time elapse. The CPU checks whether there is a difference between different pieces of frame data in time scale, and if there is a difference, the CPU determines that a moving object is present. The still image is binarized, and is then alternately stored in the plurality of frame memories. Typically, a pair of frame memories alternate between a reading operation and a writing operation. In this way, the still images in time scale are derived from the video signal as a raw signal frame by frame, and one frame is successively compared with another to monitor the moving object.

The video camera device sequentially monitors at least one single surveillance area. A single apparatus thus monitors a wide surveillance area. The video camera device includes a CCD camera. With the CCD camera incorporated, compact design is implemented, and RGB signal is acquired on a per pixel basis. Subsequent process becomes easy. Since the CCD camera includes a zoom lens controlled by the CPU, the image of the moving object may be partially enlarged.

In accordance with the present invention, a whole body tracking mode is available. The CPU retrieves the frame data stored in the frame memory, compares the frame data with immediately prior frame data to determine a difference therebetween, and controls the panhead to track coordinates corresponding to the difference if the difference is detected. A moving object monitoring surveillance apparatus having no tracking mode detects only a pass of a moving object entering the surveillance area. With the tracking mode incorporated, a surveillance apparatus can monitor the moving object for a longer time. The determination of the moving object is performed by detecting a difference between successively written pieces of frame data.

The present invention provides another mode in addition to the tracking mode. The coordinates corresponding to the difference are tracked while a particular color predetermined to zoom up a difference image on an entire frame is detected. If the predetermined particular color is detected, the zoom lens is controlled to zoom in the particular color. To detect a person as the moving object, the predetermined particular color is a flesh color, and the image of the face of the person typically identifying the person is captured. The flesh color may be designated, and zoomed in if the flesh color is detected.

In accordance with the present invention, the zoom lens is controlled so that a zoom-in operation is further performed on the particular color if the particular color of the difference image zoomed in on the entire frame is detected. If the particular color is the flesh color, a portion of the image corresponding to the face is expanded and stored in an image database as data.

DESCRIPTION OF THE PREFERRED EMBODIMENTS

Figure 1:
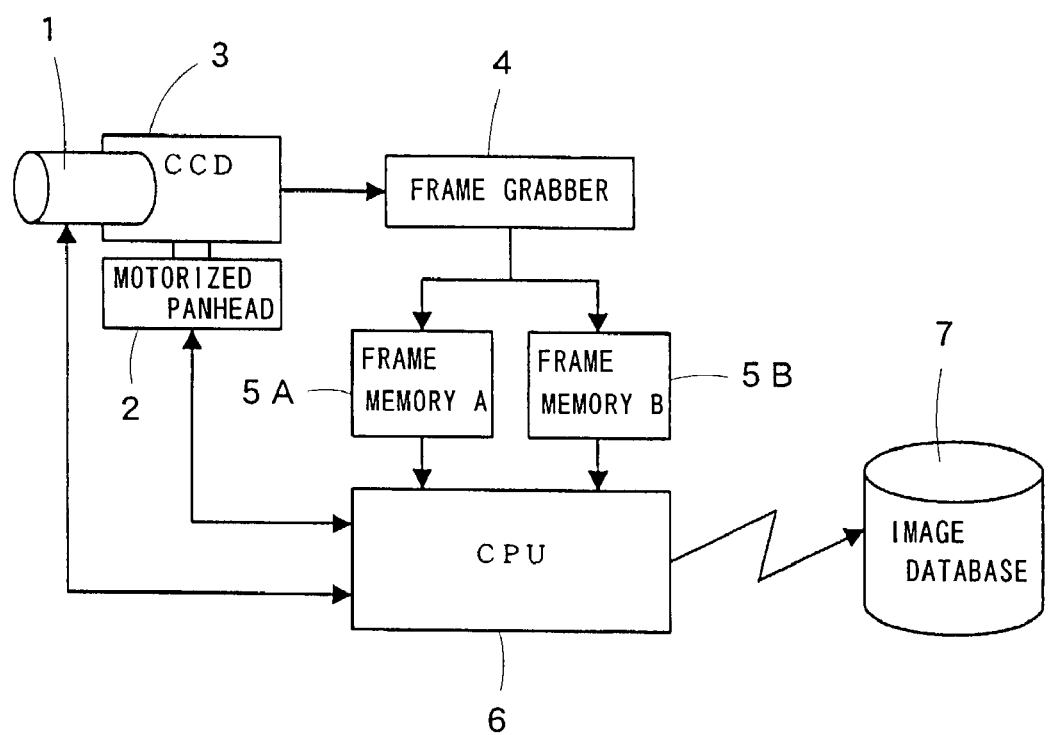
FIG. 1 is a block diagram illustrating the construction of an apparatus of the present invention.

The preferred embodiments of the present invention will now be discussed with reference to the attached drawings. FIG. 1 is a block diagram of a moving object monitoring surveillance apparatus of the present invention. A zoom lens 1 continuously varies the focal length thereof, a motorized panhead 2 is motor driven for panning and tilting operations, and a CCD camera 3 converts an image taken by the zoom lens 1 into a video signal. The moving object monitoring surveillance apparatus thus constructed monitors a predetermined area, and tracks a moving object using the motorized panhead 2 if the moving object enters the predetermined area, and zooms in and out the moving object using the zoom lens 1. A frame grabber 4 receives the video signal into which the CCD camera 3 converts the image, and selectively transfers the video signal to memories at a subsequent stage. Frame memories 5A and 5B, mutually identical to each other and arranged in parallel, receive and store the video signal of frames selectively alternately transmitted thereto from the frame grabber 4. A CPU 6 recognizes the image output from the frame memories 5A and 5B, outputs a signal controlling the zoom lens 1 and motorized panhead 2, temporarily stores the image of the whole body of the moving object, and zoomed-in image thereof, and transfers these images to an image database 7. The image database 7 successively stores these images. The CPU 6 has a memory area therewithin for storing primary data. Alternatively, a memory area may be reserved in a peripheral unit.

Figure 2:
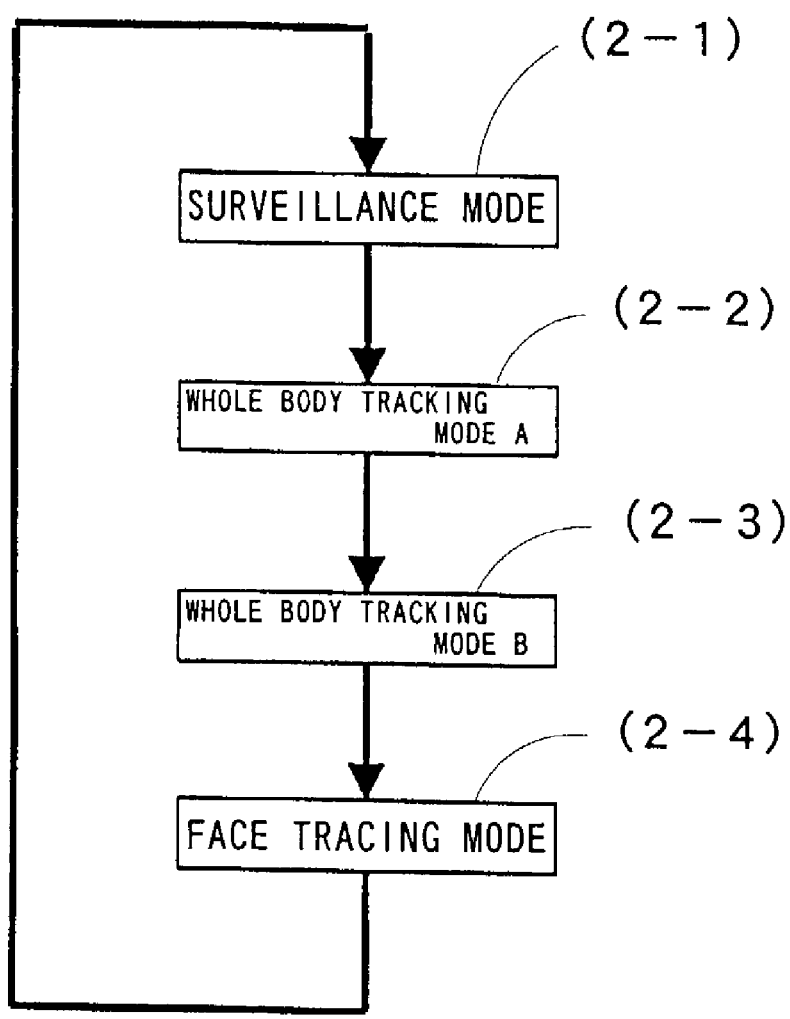
FIG. 2 is a flow diagram showing the process of the apparatus of the present invention.

The process of the surveillance apparatus for continuously watching a surveillance area is shown in a flow diagram in. FIG. 2. The area sensor of the present invention scans a predetermined surveillance area by controlling the motorized panhead 2 (surveillance mode 2-1). The focus of the zoom lens 1 is then adjusted to a short focal point for wide area monitoring. If a moving object, such as a person, walks into the surveillance area, the apparatus tracks the walking person, and zooms in the person by controlling the zoom lens 1 taking into consideration the size of the person (whole body tracking mode A 2-2) when the person stops walking. Another whole body tracking mode B works in succession, focusing on the flesh color of the person when the person is continuously walking, and recognizing and tracking the flesh color only (2-3). In each of the whole body tracking modes A and B, frame data in one of the frame memories 5A and 5B is compared with immediately prior frame data to determine a difference. If a difference is detected, the apparatus determines that a moving object is present, and continuously tracks the difference. If the apparatus locks onto a person in the tracking operation, the apparatus shifts to a face tracking mode to zoom in a large flesh color portion for enlargement (2-4). Generally, if the moving object under surveillance is a person, the person is identified only after identifying the person's face. The color of the face, namely, the flesh color falls within some range in terms of color and hue. As a factor to zoom in the face of a person, the flesh color is captured by the CCD camera 3 and then a zoom-in operation is performed.

Figure 3:
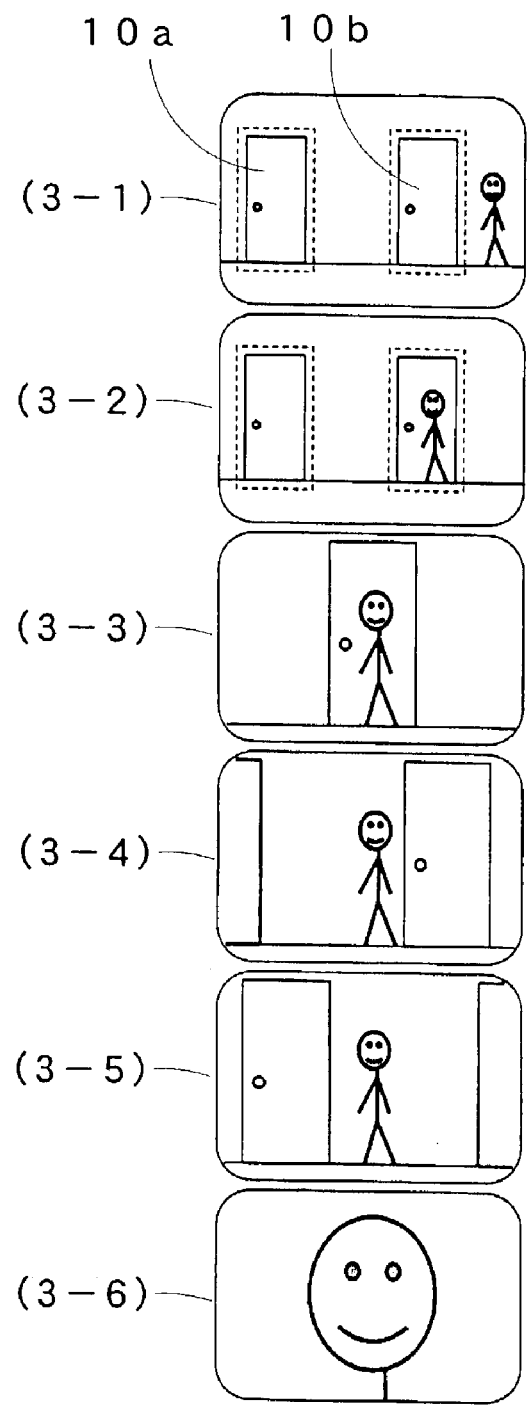
FIG. 3 shows an example of diagrams of a surveillance operation of the apparatus of the present invention.

The above operation is discussed further in detail. Referring to FIGS. 3(3-1) through 3(3-6), two surveillance areas respectively surrounding two doors 10a and 10b are set up. The area sensor alternately monitors the doors 10a and 10b. When a person approaches the surveillance areas from outside, the CCD camera 3 recognizes but still does not enter a surveillance action (3-1). If a person enters any surveillance area, the apparatus detects the person (3-2), and shifts to the whole body tracking mode A (3-3). In the whole body tracking mode A, the motorized panhead 2 is controlled to pan and tilt the camera to locate the person in the center of the frame of the CCD camera 3, and the focus of the zoom lens 1 is adjusted for a zoom-in action so that the surveillance area fully expands on the entire screen. If the person continuously walks, the motorized panhead 2 is panned and tilted to track the person to keep the image of the person at the center of the CCD camera 3 (3-4). If the person stops walking, the zoom lens 1 is further controlled to zoom further in the person. The apparatus shifts to the whole body tracking mode B, detecting the flesh color of a portion of the person typically corresponding to the face of the person. The motorized panhead 2 is panned and tilted while the focus of the zoom lens 1 is controlled to zoom in the person so that the face is imaged on the entire screen in accordance with the area of the flesh color. The apparatus thus recognizes the person who enters the surveillance area, and captures the image of the face. A series of surveillance actions thus end.

Figure 4:
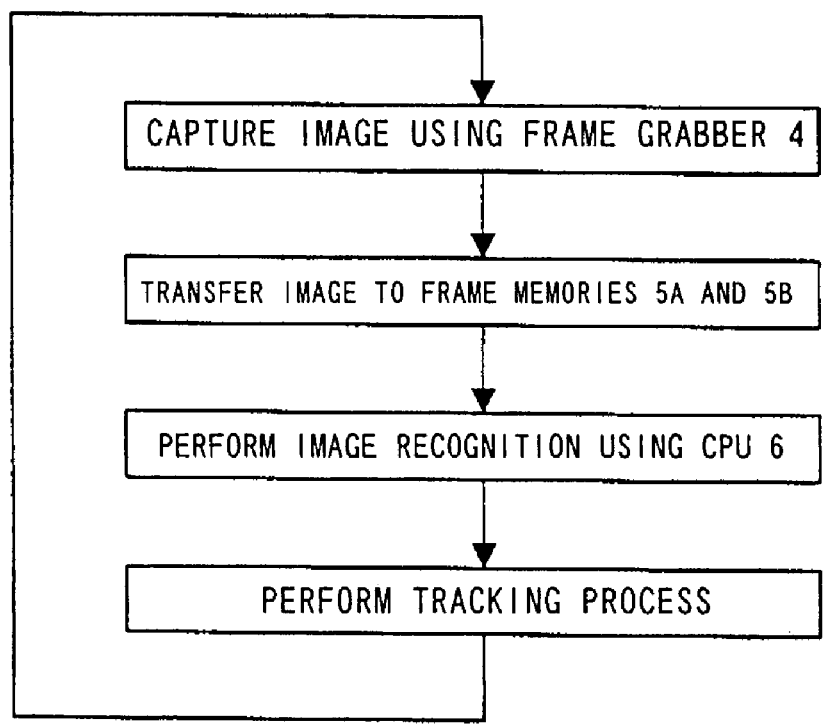
FIG. 4 is a flow diagram showing the acquisition of frame data in the apparatus of the present invention.

FIG. 4 shows the process of the moving object monitoring surveillance apparatus for successively processing an image captured by the CCD camera 3. The video signal, into which the CCD camera 3 converts the image, is converted into image data through the frame grabber 4, and is then alternately output to the frame memories 5A and 5B. In a programmed procedure, the CPU 6 recognizes the image data stored in the frame memories 5A and 5B, and performs a conversion process, and starts a tracking process if a moving object is a person. If the moving object is not a human, but a machine or an animal, and if the flesh color is not recognized in the process, subsequent process steps are canceled after at least one recognition process is performed. The apparatus returns to a surveillance mode.

Figure 5:
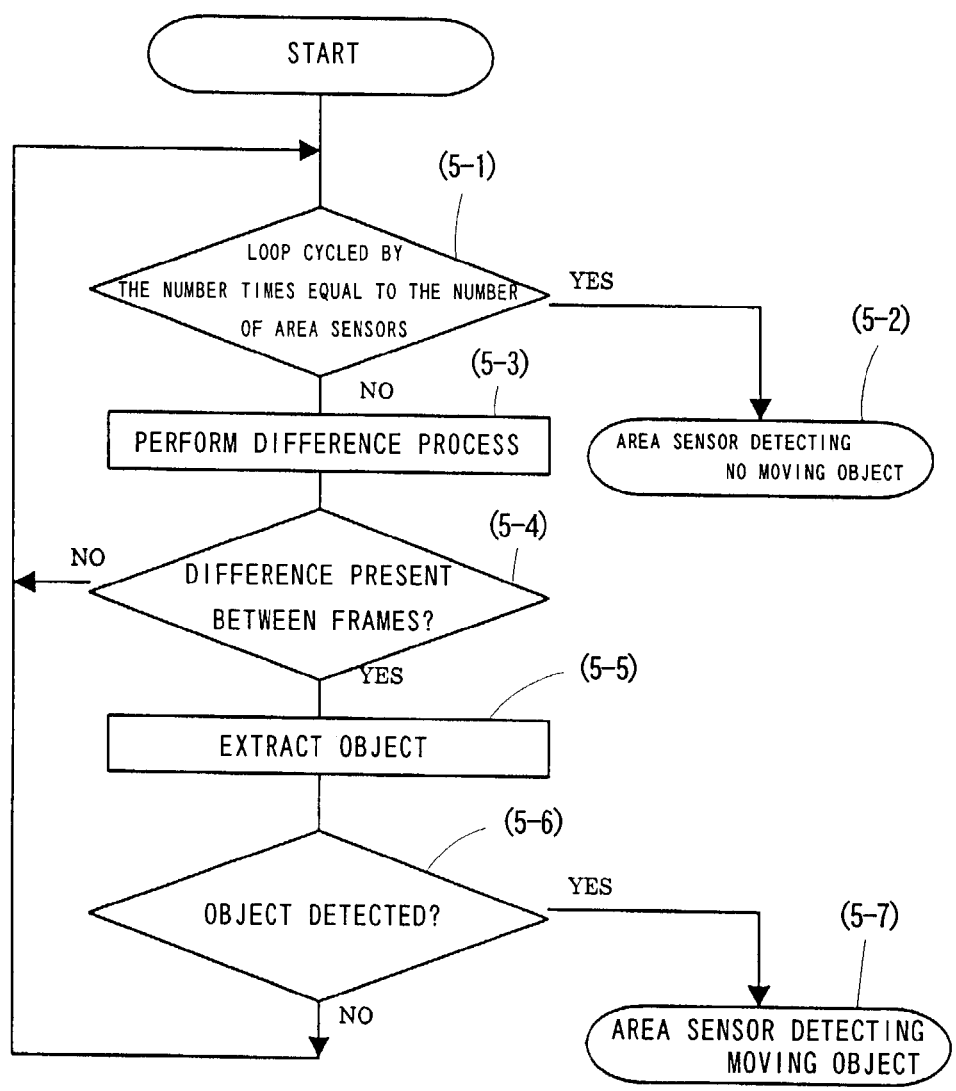
FIG. 5 is a flow diagram of the process of the apparatus of the present invention for detecting a moving body.
Figure 6:
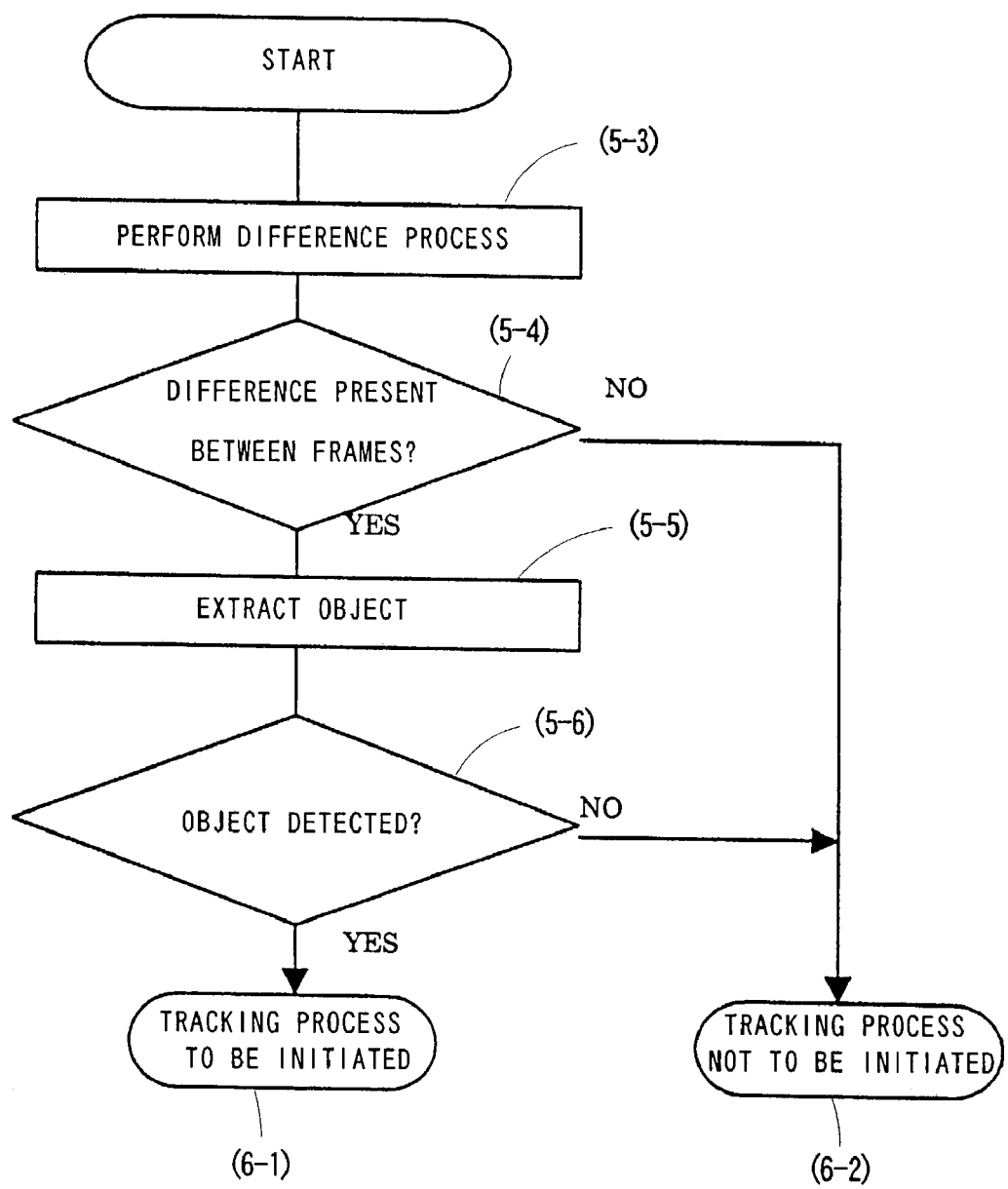
FIG. 6 is a flow diagram of a whole body tracking mode A of the apparatus of the present invention.
Figure 7:
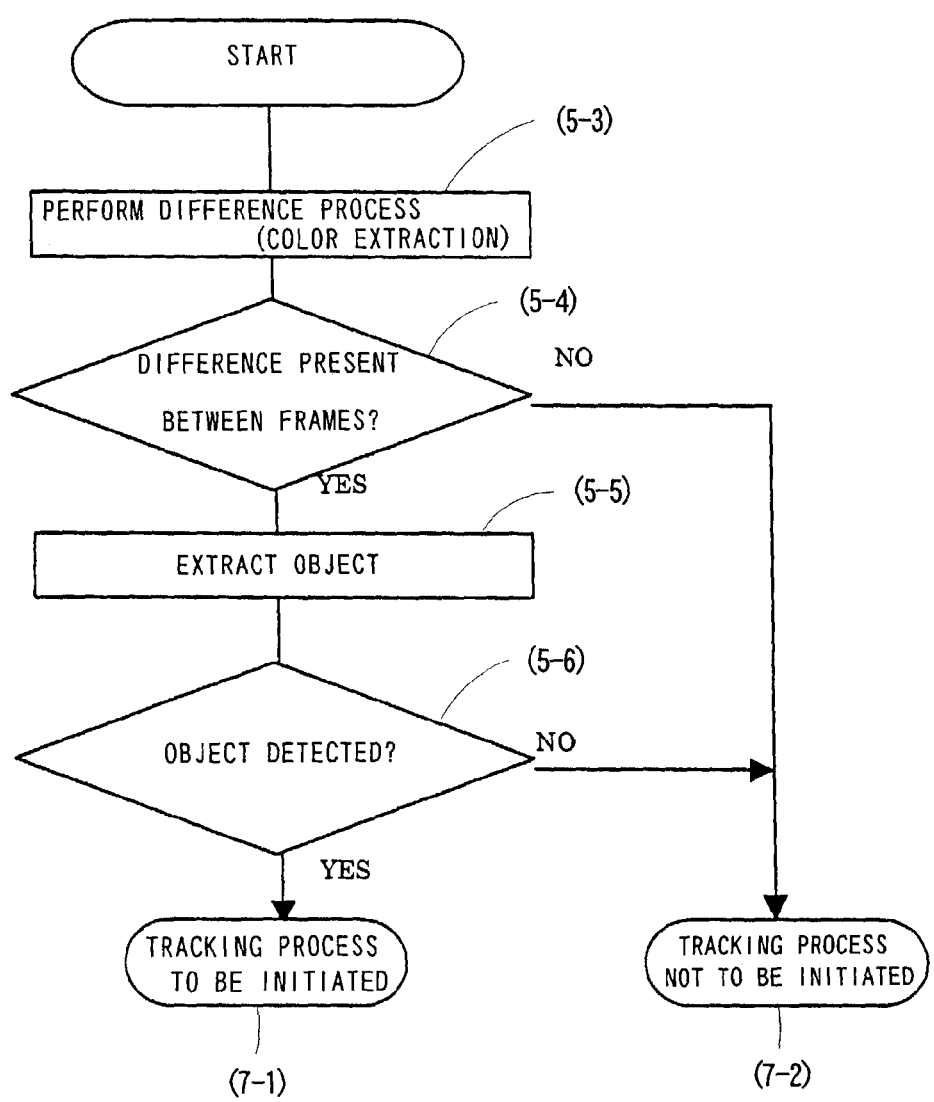
FIG. 7 is a flow diagram of a whole body tracking mode B of the apparatus of the present invention.

FIG. 5 is a flow diagram for determining whether a moving object enters a surveillance area. The apparatus of the present invention successively monitors a plurality of surveillance areas (step 5-1). If no moving object is detected in the video signal of the CCD camera 3, the apparatus determines that no moving object is detected after the CCD camera 3 scans by a predetermined number of times equal to the number of surveillance areas (step 5-2). The frame memories 5A and 5B may or may not store the image of the surveillance area with no moving object present. When the CCD camera 3 detects a moving object, a difference determination process is performed if one of the frame memories 5A and 5B stores an immediately prior frame for a predetermined surveillance area (step 5-3). If a difference is detected between current frame data and the immediately prior frame data (step 5-4), the apparatus determines that a moving object is present (step 5-5 and step 5-6), and shifts to a process for extracting the moving object image (step 5-7). If the apparatus is unable to determine that a moving object is present, the algorithm loops to the first step to start over. The extraction mode for extracting the moving object image is followed by the tracking modes. The apparatus continuously performs the whole body tracking mode A shown in FIG. 6 and the whole body tracking mode B shown in FIG. 7 in succession. As already discussed, the difference between the modes A and B is that the moving object image is fully expanded on the entire frame in the whole body tracking mode A while the flesh color of a portion of the moving object (person) corresponding to the face is detected to expand mainly that portion in the whole body tracking mode B.

Figure 8:
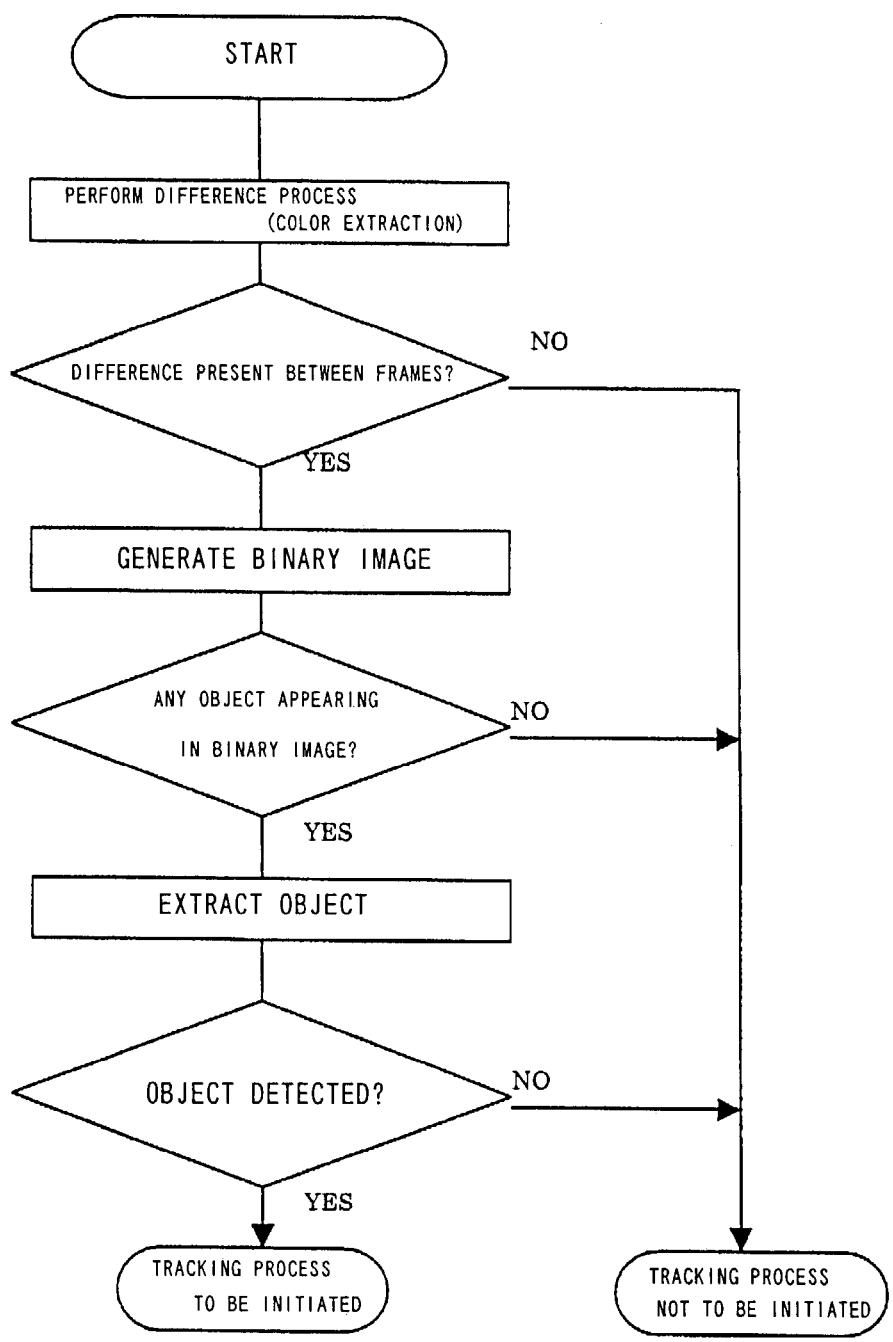
FIG. 8 is a flow diagram of a face tracking mode of the apparatus of the present invention.

FIG. 8 shows a process of a face tracking mode which is the final determination process shown in FIG. 2. An expansion process is performed focusing on the flesh color of the moving object imaged within the frame. These processes are carried out by the CPU 6, and the image of the moving object is treated as binary image data.

Figure 9:
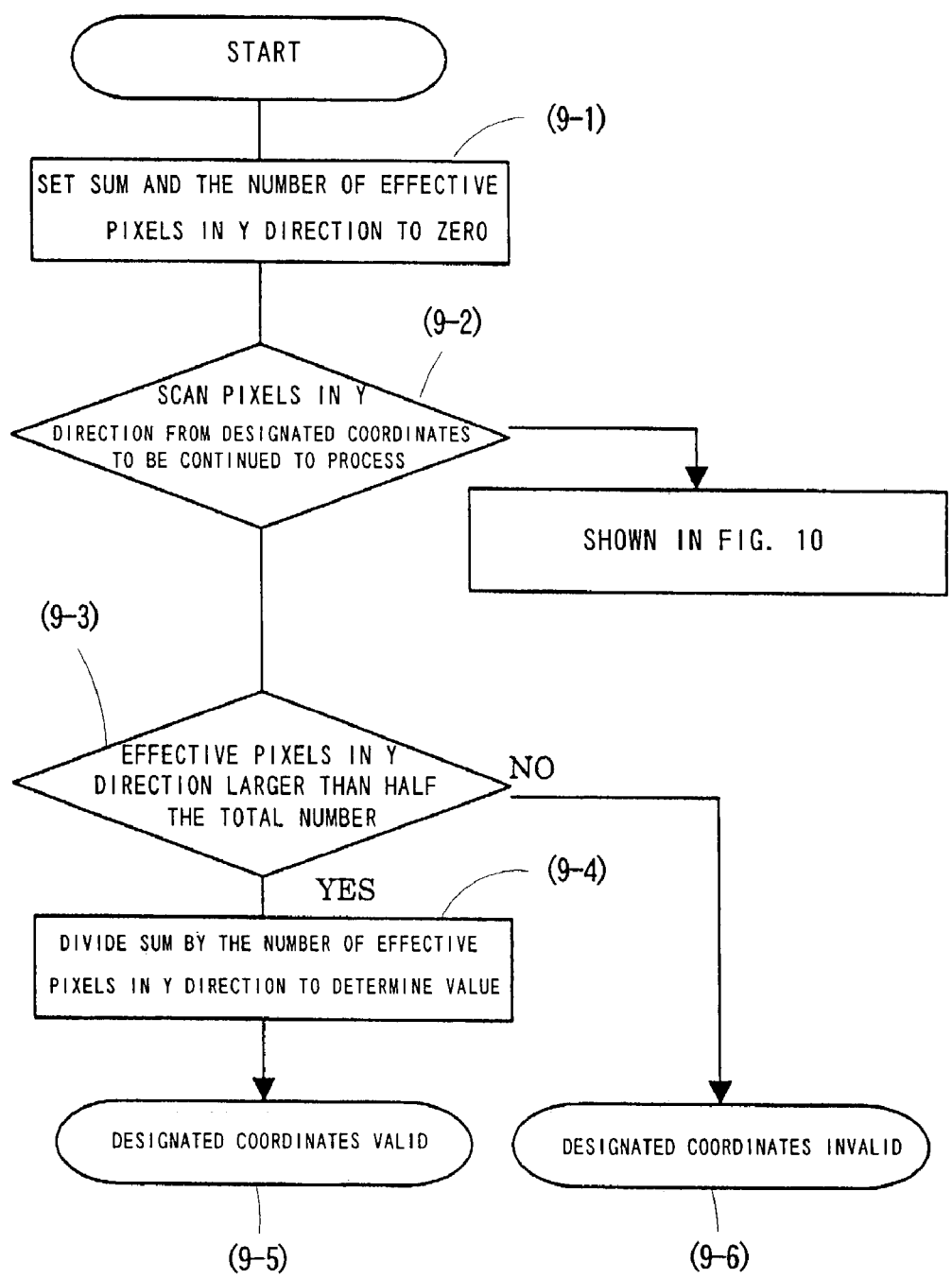
FIG. 9 is a flow diagram (X direction scan) of the apparatus of the present invention that acquires value during a flesh color detection.

A process for identifying a tracked person is discussed further with reference to FIG. 9. Value of the captured image is determined here. The CPU 6 sets, to be zero, the sum of the pixels and the number of effective pixels of a two-dimensional image in Y direction in the image data retrieved into the CPU 6 (step 9-1). From designated coordinates (zero point, for example), the CPU 6 scans the pixels in the Y direction (step 9-2) to detect the number of effective pixels in the Y direction (step 9-3). If the number of effective pixels is equal to or above half the total number of pixels in the Y direction, the designated coordinates are set to be effective. Value is then calculated by dividing the sum in the Y direction by the number of effective pixels (steps 9-4 and 9-5). If the number of effective pixels in the Y direction fails to reach half the total number in the Y direction, the calculation of value is subject a large error, and the CPU 6 determines that the coordinates are invalid (step 9-6).

Figure 10:
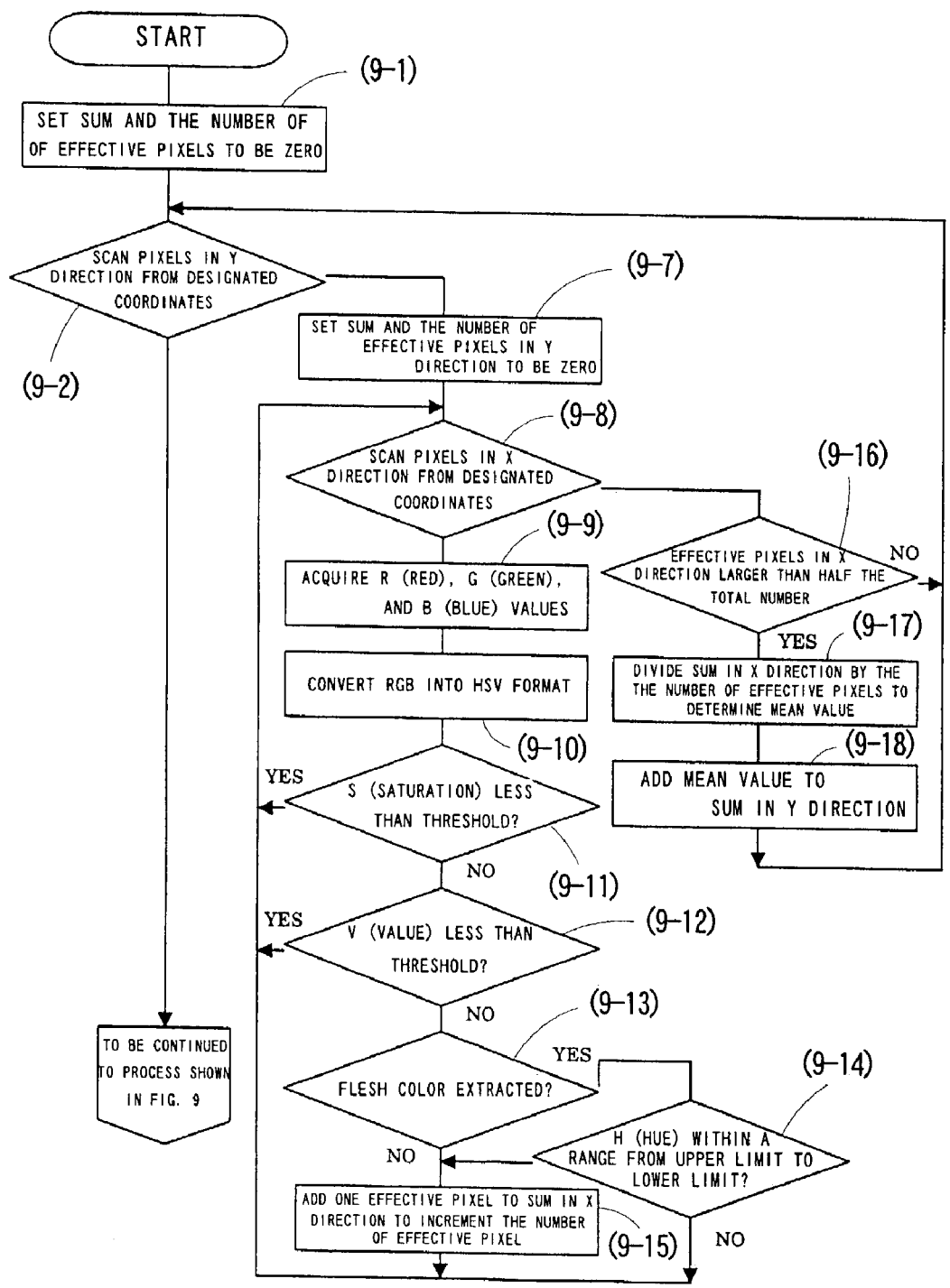
FIG. 10 is a flow diagram (Y direction scan) of the apparatus of the present invention that acquires value during the flesh color detection.

If the CPU 6 is unable to scan the pixels in the Y direction in step 9-2 in FIG. 9, a flow diagram shown in FIG. 10 is used. If the CPU 6 is unable to scan the pixels in the Y direction, the number of effective pixels is set to be zero (step 9-7), and the CPU 6 scans the pixels in the X direction from the designated coordinates (step 9-8). RGB values are acquired from the frame data (step 9-9), and are then converted into HSV format (step 9-10). If the converted data has S (saturation) equal to or larger than a threshold (step 9-11), and V (value) equal to or larger than a threshold (step 9-12), the data is regarded as effective, and a determination is made of whether the flesh color is present or absent (step 9-13). If the flesh color in hue falls within a range between an upper limit and a lower limit (step 9-14), or if the flesh color is not detected, the sum of data in X direction is incremented (step 9-15). The algorithm loops to the determination step (step 9-8). If it is determined in step 9-8 that the CPU 6 does not scan the pixels in the X direction from the designated coordinates, and if the number of effective pixels is above half the total pixels in the X direction (step 9-16), a mean value is calculated by dividing the sum in the X direction by the number of effective pixels (step 9-17). The mean value is added to the sum in the Y direction (step 9-18), and the algorithm loops to step 9-2. Even if it is determined in step 9-16 that the number of effective pixels is less than the total number of pixels in the X direction, the algorithm loops to step 9-2, the algorithm loops step 902 for the Y direction determination. In this way, X and Y direction processes are successively performed. The designated coordinates are successively shifted, and the value for each coordinates is calculated, and an effective image within the frame is acquired.

Figure 11:
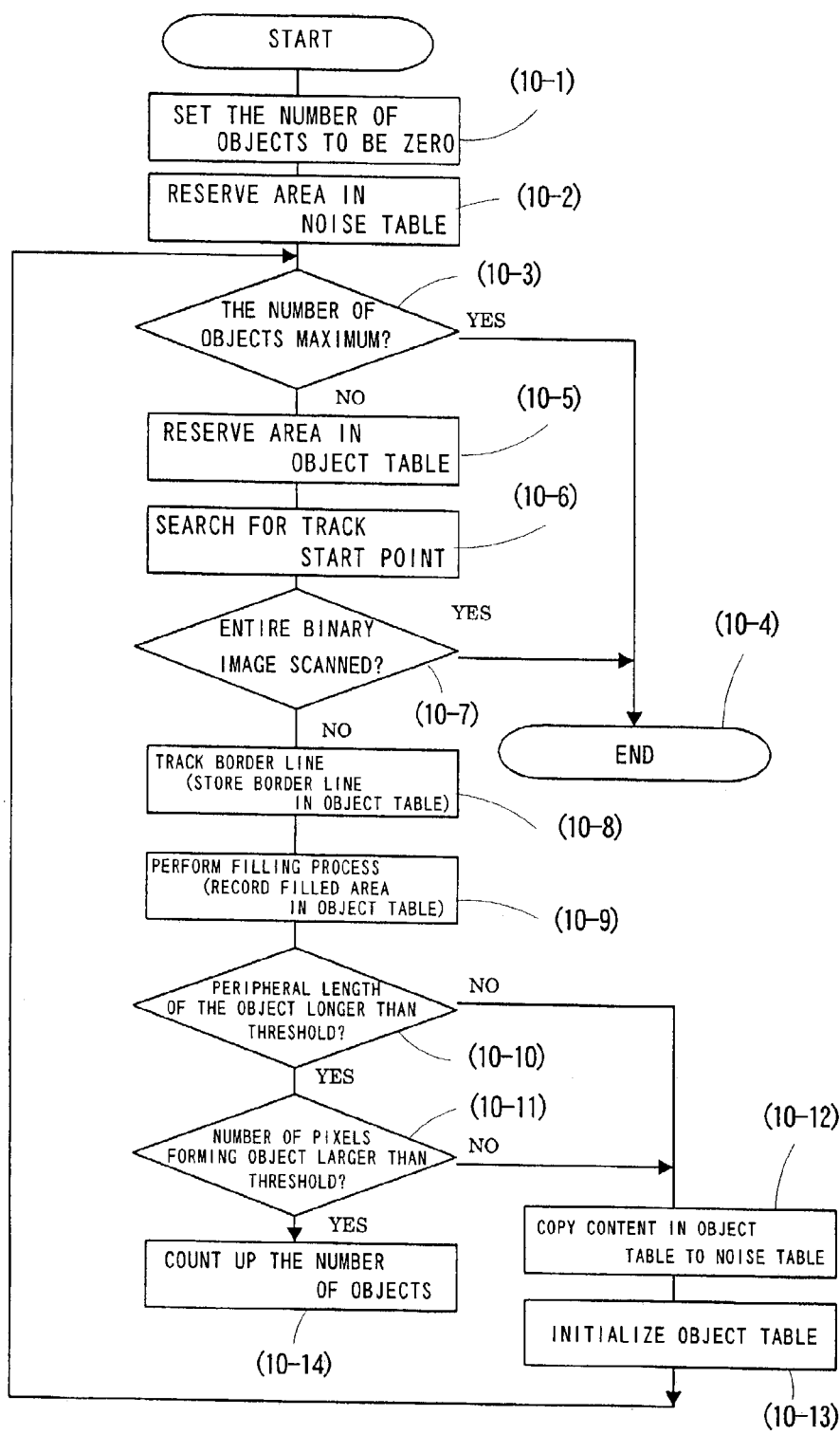
FIG. 11 is a flow diagram of the apparatus of the present invention which extracts a moving object.

FIG. 11 shows in detail a subroutine "object extraction" common to the processes described in the flow diagrams shown in FIGS. 5, 6, 7, and 8. The common subroutine discriminates an individual object from the binary-image obtained from the "difference process" shown in FIGS. 5 and 6, and "binary image generation process (flesh color extraction process)" shown in FIGS. 7 and 8. For example, the common subroutine discriminates the face or hand of a person from the binary image of the extracted flesh color portion. The object is identified as an area where pixels "1" congregate.

Specifically, if the above-referenced process determines that the moving object is a human, the number of objects is set to be zero (step 10-1). A partition for storing the binary image, called a "noise table" is reserved in the memory (step 10-2). Noise such as flickering, different from an object to be extracted, takes place in color pixels in an analog electrical system in the camera and the frame grabber. If the color pixels are binarized, the frame is dotted with pixels having "1", and the recognition of an object becomes difficult. It is then determined whether the size of a moving object to be processed is maximized (step 10-3). The CPU 6 determines whether the moving object is further expandable. Specifically, the moving object within the frame is detected. If the size of the moving object (the number of objects) reaches a maximum value, the expansion process is stopped (step 10-4), and the data is then sent to the image database 7. The maximum value of objects is preset taking into consideration the storage capacity of the CPU 6 and performance of the apparatus. The maximum value of objects becomes a maximum value of the object table.

If the size of the object to be processed is not yet maximized, an area in the object table is reserved, and an area for storing the binary image is reserved in the memory (step 10-5). The CPU 6 searches for the start point of tracking by the CCD camera 3 (step 10-6). Specifically, the apparatus raster scans from the top left corner, thereby searching for pixels "1". The CPU 6 determines whether the entire binary image in the surveillance area from the start point (step 10-7) is scanned. If the pixel "1" is detected in the course of scanning, a border line between the moving object and the background is tracked. The CPU 6 extracts the outline of the area of the pixels "1", and records the outline in the object table (step 10-8). A filling process is performed to fill the interior of the outline with the pixels "1", and the filled area is then stored in the object table (step 10-9). The filling process includes not only filling the interior of the border line of the moving object image captured but also identifying the image by scanning the interior of the object image. The border line tracking process and the filling process allow the object to be correctly recognized even if the binary image is generated from a relatively poor quality image.

The peripheral length (border line length) and the number of pixels of the recorded object are compared with thresholds (steps 10-10 and 10-11). If the peripheral length and the number of pixels are smaller than the respective thresholds, the object is considered as noise. The content of the object table is copied to the noise table (step 10-12) while the content of the object table is discharged (step 10-13). If the peripheral length and the number of pixels of the object are equal to or larger than the respective thresholds, the number of objects is incremented by one (step 10-14). The same process is repeated until the number of objects is maximized. If the number of moving objects is a plural number in the "object extraction", for example, 3, three object tables and one noise table are output. The size of the moving object and correlation of the data are picked up and a single object is selected and used in the tracking process.

In accordance with the present invention, a single or a plurality of surveillance areas are successively monitored using a single CCD camera. The moving object such as a person is tracked even before it enters the surveillance area. When the moving object stops moving within the surveillance area, the flesh color portion is zoomed up for detection. The person is thus identified from the feature of the face.

INDUSTRIAL APPLICABILITY

A moving object monitoring surveillance apparatus includes a video device acquiring information of the image of a moving object as a video signal, a panhead for panning and tilting the video device, a frame grabber for extracting, frame by frame, a still image from the video signal output from the video device and binarizing the still image, a plurality of frame memories for alternately storing the binarized frame data, a CPU for controlling the operation of the panhead and for processing the frame data, and an image database for storing the processed data. The video device, freely controlled by the panhead, monitors the surveillance area and successively records the frame data, which is then successively processed. The video device successively monitors at least one surveillance area. A single video apparatus thus efficiently scans a plurality of surveillance area. The CCD camera, used for the video device, faithfully acquires RGB information. The RGB information is easily organized into data and then easily processed. Since the CCD camera is provided with a zoom lens for optical input, a portion of the moving object is expandable.

In accordance with the present invention, the CPU retrieves the frame data stored in the frame memory, compares the frame data with the immediately prior frame data to detect the difference therebetween, and the panhead is controlled to track the coordinates corresponding to the difference. The frame data successively written onto the frame memories is compared with one after another in time scale, and the presence of the moving object is determined based on the detection of the difference. The determination of the presence of the moving object is thus reliable. In addition, the CPU tracks the coordinates corresponding to the difference, and presents the difference image zoomed up on the entire frame. A predetermined particular color is thus detected. If the predetermined particular color is detected, the zoom lens is controlled so that more detailed information is obtained from the image once the image is determined as a moving object. In a subsequent process, the CPU controls the zoom lens so that a predetermined particular color is detected from the difference image zoomed up on the entire frame, and so that the predetermined particular color portion is further zoomed up. The feature of the moving object is reliably captured. If a person identification is intended, the predetermined particular color may be flesh color. In the final process, the face image of the person is captured in enlargement, and the identification of the person becomes easy.

What is claimed is:

1. A moving object monitoring surveillance apparatus comprising:
    a zoom lens;
    a video device acquiring information of the image of a moving object as a video signal;
    a panhead for panning and tilting the video device;
    a frame grabber for extracting, frame by frame, a still image from the video signal output from the video device and converting the still image into frame data;
    a plurality of frame memories for alternately storing the frame data;
    a CPU for controlling the operation of the panhead and the zoom lens, and for processing the frame data; and
    an image database for storing the processed data, wherein the CPU retrieves the frame data stored in the frame memory, compares the frame data with immediately prior frame data to detect a difference therebetween, controls the panhead to track coordinates corresponding to the difference when the difference is detected, controls the zoom lens to zoom up a difference image corresponding to the difference on an entire frame, detects a particular color in the difference image zoomed up, and controls the zoom lens to further zoom up the particular color portion of the difference image when the particular color is detected.

2. A moving object monitoring surveillance apparatus according to claim 1, wherein the particular color is a flesh color.

3. A method for zooming in on a particular color portion of a moving object under surveillance, the method comprising the steps of:
    a) providing a moving object surveillance apparatus comprising:
        a zoom lens;
        a video device acquiring information of the image of a moving object as a video signal;
        a panhead for panning and tilting the video device;
        a frame grabber for extracting, frame by frame, a still image from the video signal output from the video device and converting the still image into frame data;
        a plurality of frame memories for alternately storing the frame data;
        a CPU for controlling the operation of the panhead and the zoom lens, and for processing the frame data; and
        an image database for storing the processed data;
    b) monitoring a surveillance area with the moving object surveillance apparatus to detect a moving object within the surveillance area;
    c) zooming in on the moving object so that an image of the moving object is expanded within the frame;
    d) detecting a particular color in the expanded image of the moving object; and
    e) zooming in on a portion of the moving object detected as having the particular color so that an image of the portion of the moving object having the particular color is further expanded within the frame.

4. The method of claim 3 further comprising the step of storing the image of the portion of the moving object having the particular color.

5. The method of claim 3 wherein the moving object is a human.

6. The method of claim 5 wherein the particular color is a flesh color.

7. The method of claim 6 wherein the flesh colored portion of the human is a face.

8. A method for zooming in on an identifying feature of a moving object under surveillance, the method comprising the steps of:
    a) providing a moving object surveillance apparatus comprising:
        a zoom lens;
        a video device acquiring information of the image of a moving object as a video signal;
        a panhead for panning and tilting the video device;
        a frame grabber for extracting, frame by frame, a still image from the video signal output from the video device and convening the still image into frame data;
        a plurality of frame memories for alternately storing the frame data;
        a CPU for controlling the operation of the panhead and the zoom lens, and for processing the frame data; and
        an image database for storing the processed data; and
    b) monitoring a surveillance area with the moving object surveillance apparatus, the step of monitoring including a first whole body tracking mode and a second whole body tracking mode in succession;
    wherein in the first whole body tracking mode the CPU retrieves the frame data stored in the frame memory, compares the frame data with the immediately prior frame data to detect a difference therebetween that corresponds to the moving of an object within the surveillance area, controls the zoom lens to zoom in on the moving object so that an image of the moving object is expanded within the frame, and controls the panhead to locate the moving object in the center of the frame and tracks the movement of the moving object thereafter; and wherein in the second whole body tracking mode the CPU retrieves the frame data of the expanded image of the moving object from the first whole body tracking mode stored in the frame memory, compares the frame data from the first whole body tracking mode with the immediately prior frame data therein to detect a difference in a predetermined particular color corresponding to an identifying feature of the moving object, controls the panhead to locate the identifying feature in the center of the frame, and controls the zoom lens to zoom in on the identifying feature so that an image of the identifying feature is further expanded within the frame.

9. The method of claim 8 wherein the moving object is a human.

10. The method of claim 9 wherein the identifying feature is a face.

11. The method of claim 9 wherein the particular color is a flesh color.

12. The method of claim 10 further comprising the step of storing the frame having the fully expanded image of the identifying feature.

* * * * *

UNITED STATES PATENT AND TRADEMARK OFFICE
CERTIFICATE OF CORRECTION

| | | |
|---|---|---|
| PATENT NO. | : 7,355,627 B2 | Page 1 of 1 |
| APPLICATION NO. | : 10/350832 | |
| DATED | : April 8, 2008 | |
| INVENTOR(S) | : Sadahiko Yamazaki et al. | |

It is certified that error appears in the above-identified patent and that said Letters Patent is hereby corrected as shown below:

COLUMN 8
Line 55, replace "convening" with --converting--.

Signed and Sealed this

Twenty-sixth Day of August, 2008

JON W. DUDAS
*Director of the United States Patent and Trademark Office*